United States Patent
Lee

(10) Patent No.: US 10,818,012 B1
(45) Date of Patent: Oct. 27, 2020

(54) METHOD FOR FACIAL SKIN AGE ESTIMATING AND ELECTRONIC DEVICE

(71) Applicant: NEO DERM GROUP LIMITED, Hong Kong (HK)

(72) Inventor: Ho Cheung Lee, Hong Kong (HK)

(73) Assignee: NEO DERM GROUP LIMITED, Hong Kong (HK)

( * ) Notice: Subject to any disclaimer, the term of this patent is extended or adjusted under 35 U.S.C. 154(b) by 0 days.

(21) Appl. No.: 16/904,558

(22) Filed: Jun. 18, 2020

(51) Int. Cl.
*G06T 7/00* (2017.01)
*H04N 9/67* (2006.01)
*G06T 7/90* (2017.01)
*G06T 3/40* (2006.01)
*G06T 5/20* (2006.01)

(52) U.S. Cl.
CPC .............. *G06T 7/0014* (2013.01); *G06T 3/40* (2013.01); *G06T 5/20* (2013.01); *G06T 7/90* (2017.01); *H04N 9/67* (2013.01); *G06T 2207/10024* (2013.01); *G06T 2207/20081* (2013.01); *G06T 2207/20084* (2013.01); *G06T 2207/30088* (2013.01); *G06T 2207/30201* (2013.01)

(58) Field of Classification Search
CPC ...... A61B 5/441; A61B 5/442; G06K 9/4652; G06T 11/00
See application file for complete search history.

(56) References Cited

U.S. PATENT DOCUMENTS

2008/0212894 A1* 9/2008 Demirli .................. G06T 11/00
382/276

* cited by examiner

*Primary Examiner* — Manuchehr Rahmjoo

(57) ABSTRACT

A method for facial skin age estimating and electronic device. The method includes: adjusting illumination component and color component of a facial image depending on a reference image; analyzing a plurality of evaluation index for assessing skin condition on interest area of the facial image and estimating the skin age of the facial image, according to the evaluation index.

12 Claims, 6 Drawing Sheets

US 10,818,012 B1

METHOD FOR FACIAL SKIN AGE ESTIMATING AND ELECTRONIC DEVICE

TECHNICAL FIELD

The present disclosure relates to the technical field of image processing, and in particular, relates to a method for facial skin age estimating and electronic device.

BACKGROUND

Assessment of skin condition is important for skin care and treatment. Because small variation may cause significant error and inconsistency, the facial image for assessing has to take by high-quality and specially-designed cameras under controlled environmental settings such as face distance from camera, head pose angles, surrounding light color and intensity.

The strict requirement of facial image leads to inconvenience. Users need to book an appointment or travel to the center where there are professional equipment (i.e. VISIA) to assess their skin condition.

Instead of traveling to the center, users may take image by themselves, according to the guidelines on how to take acceptable photos. However, in an uncontrolled or open environment, it is difficult to guarantee that the face distance, illumination condition, etc. are well maintained every time.

SUMMARY

An embodiment of the present disclosure provides a method for image preprocessing. The method includes: resizing an input image; importing a reference image; converting the input image and the reference image from RGB color space to CIELAB color space; adjusting illumination component and color component of the input image depending on the reference image and recovering the adjusted input image from CIELAB color space to RGB color space.

Another embodiment of the present disclosure provides a method for facial skin age estimating. The method includes: resizing and aligning a facial image; converting the facial image and a reference image from RGB color space to CIELAB color space; adjusting illumination component and color component of the facial image depending on the reference image; recovering the adjusted facial image from CIELAB color space to RGB color space; analyzing a plurality of evaluation index for assessing skin condition on interest area of the facial image and estimating the skin age of the facial image, according to the evaluation index.

Still another embodiment of the present disclosure provides an electronic device. The electronic device includes: a memory, a communication module and a processor coupled to the memory and the communication module; the memory storing instructions that are executable by the processor, wherein execution of the instructions by the processor causes the processor via the communication module to: resizing and aligning a facial image; converting the facial image and a reference image from RGB color space to CIELAB color space; adjusting illumination component and color component of the facial image depending on the reference image; recovering the adjusted facial image from CIELAB color space to RGB color space; analyzing a plurality of evaluation index for assessing skin condition on interest area of the facial image and estimating the skin age of the facial image, according to the evaluation index.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

In order to make the objectives, technical solutions, and advantages of the present disclosure clearer, the present disclosure is further described in detail below by reference to the embodiments and the accompanying drawings. It should be understood that the specific embodiments described herein are only intended to explain the present application instead of limiting the present application.

Figure 1:
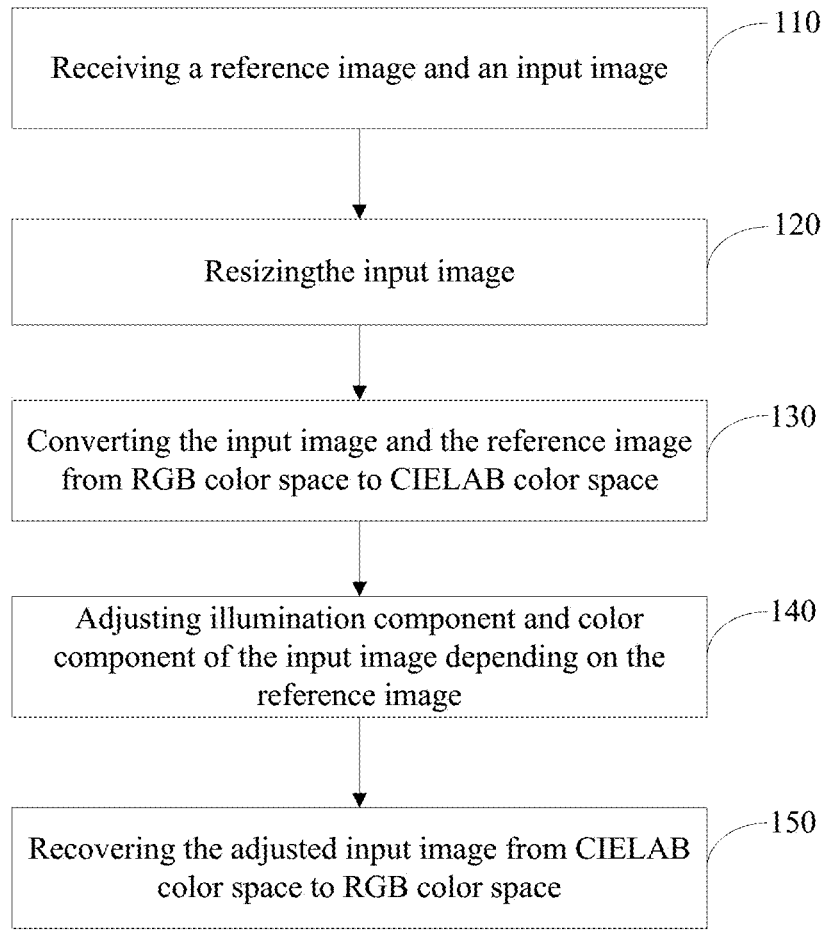
FIG. 1 is a flow chart of a method for input image preprocessing according to an embodiment of the present disclosure.

Embodiments of the present disclosure provide a method for image preprocessing. The preprocessing method could decrease the influence cause by the environment. As illustrated in FIG. 1, the method for image preprocessing includes the follow steps:

110: An image process system receives a reference image and an input image.

The image process system may be implemented by any suitable type of electronic device with ability of complicated operation. The reference image is pre-defined image which is taken in standard environment. The input image may be taken by any terminal device, such as smart phone, in open environment.

120: The image process system resizes the input image.

The input image with different size or resolution ratio has to resize in uniform size for further processing.

130: The image process system converts the input image and the reference image from RGB color space to CIELAB color space.

RGB color space is a kind of color standard. It can get all kinds of colors through the proportion of the red (R) component, green (G) component, and blue (B) component and their superposition.

CIELAB color space is another kind of color standard establish by Commission International de l'eclairage (CIE), which is also called L*a*b model. The L*a*b model consist of illumination (L) component, a component and b component. The illumination component indicates the brightness of the image. The "a component" and the "b component" is color component.

140: The image process system adjusts illumination component and color component of the input image depending on the reference image.

In L*a*b color space, the brightness and the color of the input image can be adjusted to meet a standard defined by the reference image such that the open environment influence is avoided.

150: The image process system recovers the adjusted input image from CIELAB color space to RGB color space.

For subsequent processing, the adjusted input image should be recovered to RGB color space. The method of different color space conversion is well known to those in the technical field.

Figure 2:
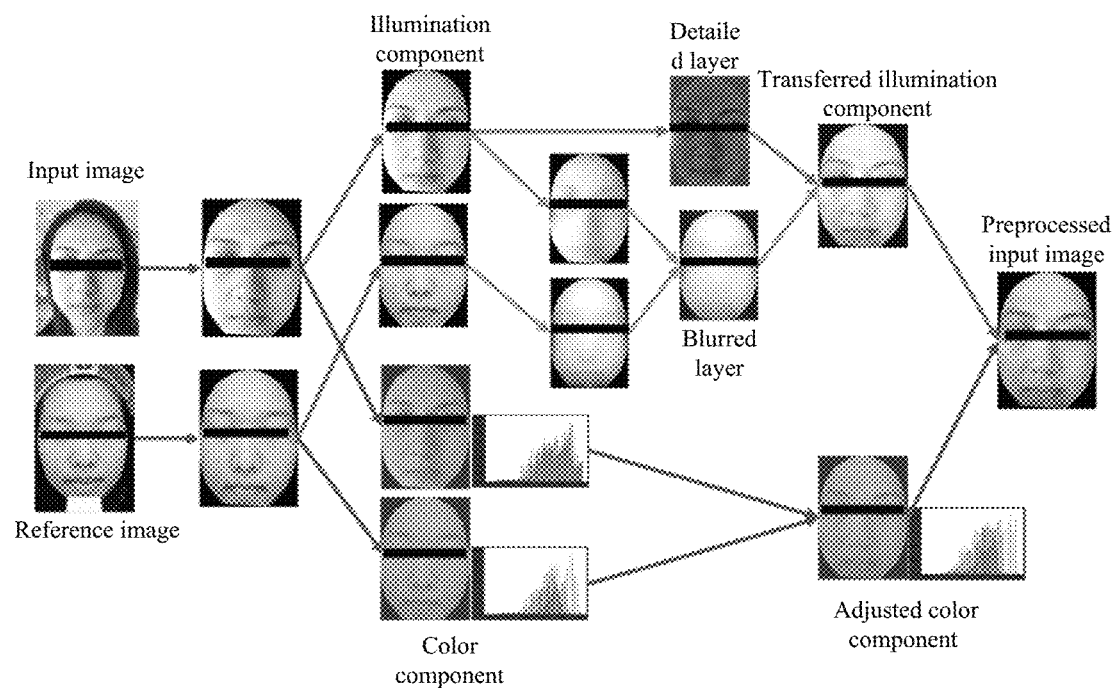
FIG. 2 is a work flow diagram of a method for illumination and color component adjusting according to an embodiment of the present disclosure.

As illustrated in FIG. 2, the method for input image adjusting includes two major part. The first part is adjusting the illumination component. The second part is adjusting the color component.

To adjust the illumination component, the illumination component of the input image needs to divide into an input detailed layer and an input blurred layer.

In one embodiment, the weighted least square filters, which has property of edge-preserving, can be employed to smooth the two lightness components to obtain blurred layers and then use division to obtain the detailed layer.

Correspondingly, a reference blurred layer is extracted from the illumination component of the reference image.

The input blurred layer can be transferred, according to the reference blurred layer such that the brightness of the input image is closed to the reference image.

In one embodiment, the reference blurred layer is filtered by guided filter with the guidance of the input blurred layer for integrating the input image and reference image.

Finally, a transferred illumination component is generated by combining the transferred input blurred layer and the input detailed layer.

To adjust the color component, the color component of the input image is standardized depending on the color component of the reference image.

As described below, the a* and b* are color chromaticity component. The statistics and color correction depending on the reference image, can be applied to the a* and b* components respectively.

The adjusted color component of the input image could combine with the transferred illumination component to generate a preprocessed input image. The preprocessed input image should be further used to estimate the skin age when the input image is a facial image taken by any portable electronic device.

To estimate the skin age, the electronic device may analyze a plurality of evaluation index for assessing skin condition on interest area of the facial image.

Any suitable evaluation index can be used. Different evaluation index may focus on different aspect of the facial skin age and need to use different area for analyzing.

Finally, the electronic device can estimate the skin age of the facial image, according to the evaluation index.

In one embodiment, the method for estimating skin age further includes follows steps:

Firstly, a benchmark from modeling the relationship between mean value of the evaluation index and an age group is generating.

Secondly, the evaluation index of the facial image is compared with the benchmark.

Thirdly, the age group corresponding to the image is determined according to the comparison result of the facial image and the benchmark.

Figure 3:
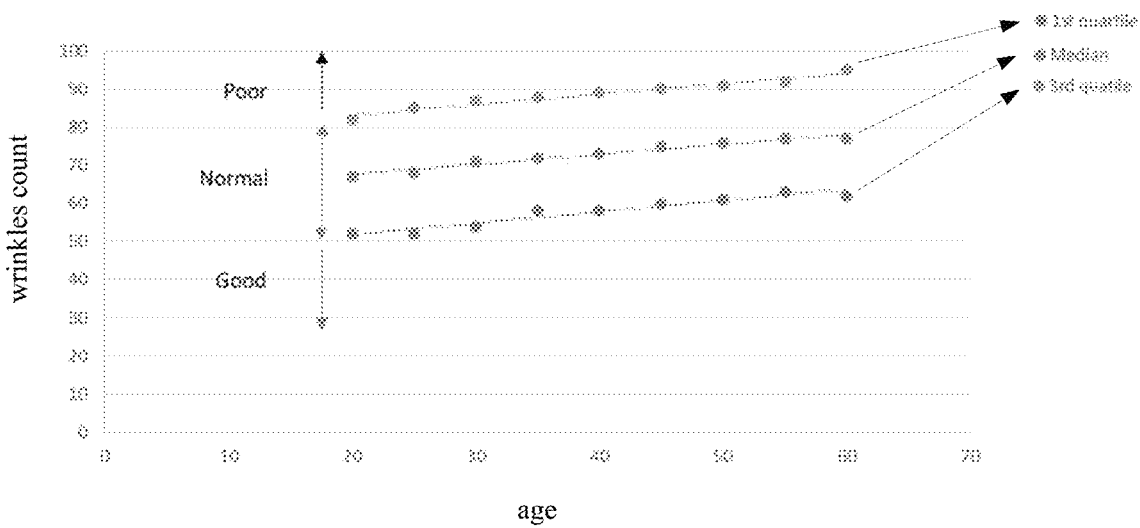
FIG. 3 is a diagram of the correlation of the wrinkles count with age according to an embodiment of the present disclosure.

As shown in FIG. 3, the abscissa of coordinate system is age and the ordinate of the coordinate system is the value of the evaluation index (i.e. wrinkles count).

The benchmark is a region defined by several straight lines. The straight lines are also indicated the liner relationship between evaluation index and age group.

In one embodiment, the evaluation index includes melanin concentration, hemoglobin concentration, wrinkles count and sagging seriousness. The details of each evaluation index are described as follow.

The melanin concentration and the hemoglobin concentration could measure the Brown spots and Red areas on the facial image. In other words, the area of the facial image could be determined brown spots and red areas, when the melanin concentration and the hemoglobin concentration is higher than a pre-defined threshold.

In one embodiment, the interest area of melanin and the hemoglobin analyzing is the whole face excluding area around mouth and chin.

Figure 4:
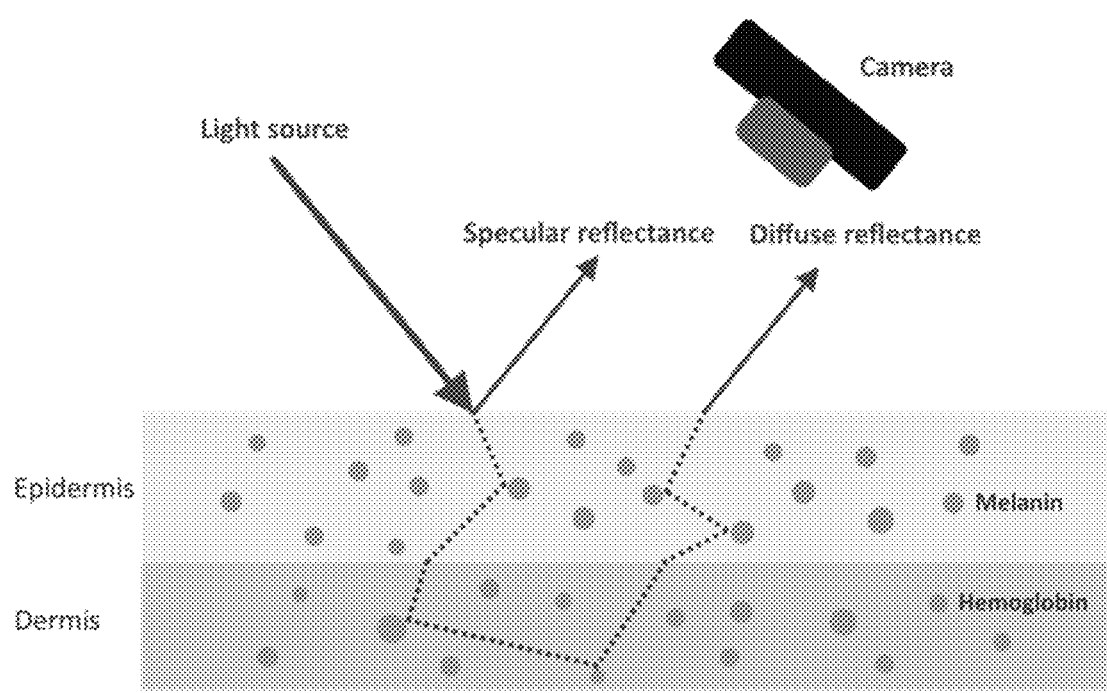
FIG. 4 is a diagram of the schematic reflection model of skin according to an embodiment of the present disclosure.

As illustrated in FIG. 4, the intensity of the incident light is decreased according to following attenuation factors when reflected by skin. One of attenuation factors comes from the attenuation caused by Lambertian reflection associated with asperity of skin surface. The other comes from the attenuation caused by absorption through skin pigmentations, melanin and hemoglobin, which are predominantly found in the epidermis and dermis respectively.

For each color (e.g. red, green, blue), the response on the digital camera sensor for a pixel i of the input image is expressed as Equation (1) below:

$$R_n^i = \int Q_n^i(\lambda) \cdot E^i(\lambda) \cdot 10^{-(\alpha_{mel}^i \varepsilon_{mel}(\lambda) + \alpha_{hem}^i \varepsilon_{hem}(\lambda))} \cdot \gamma^i d\lambda \quad (1)$$

where n=R, G, B, $R_n^i$ represents the color response for color n (e.g. red, green, blue), $\lambda$ is wavelength, $Q_n^i(\lambda)$ represents the spectral sensitivity of the camera, $E^i(\lambda)$ represents the spectral power distribution of the illuminate, $\varepsilon_{mel}(\lambda)$, $\varepsilon_{hem}(\lambda)$, $\alpha_{mel}^i$, $\alpha_{hem}^i$ represents absorption spectra and density of melanin and hemoglobin respectively, $\gamma^i$ is asperity factor of the skin surface which represent the normal direction associated with Lambertian reflection.

Normally, it can assume that incident light is uniform in local area and spectral sensitivity functions are identical throughout camera sensors.

Figure 5:
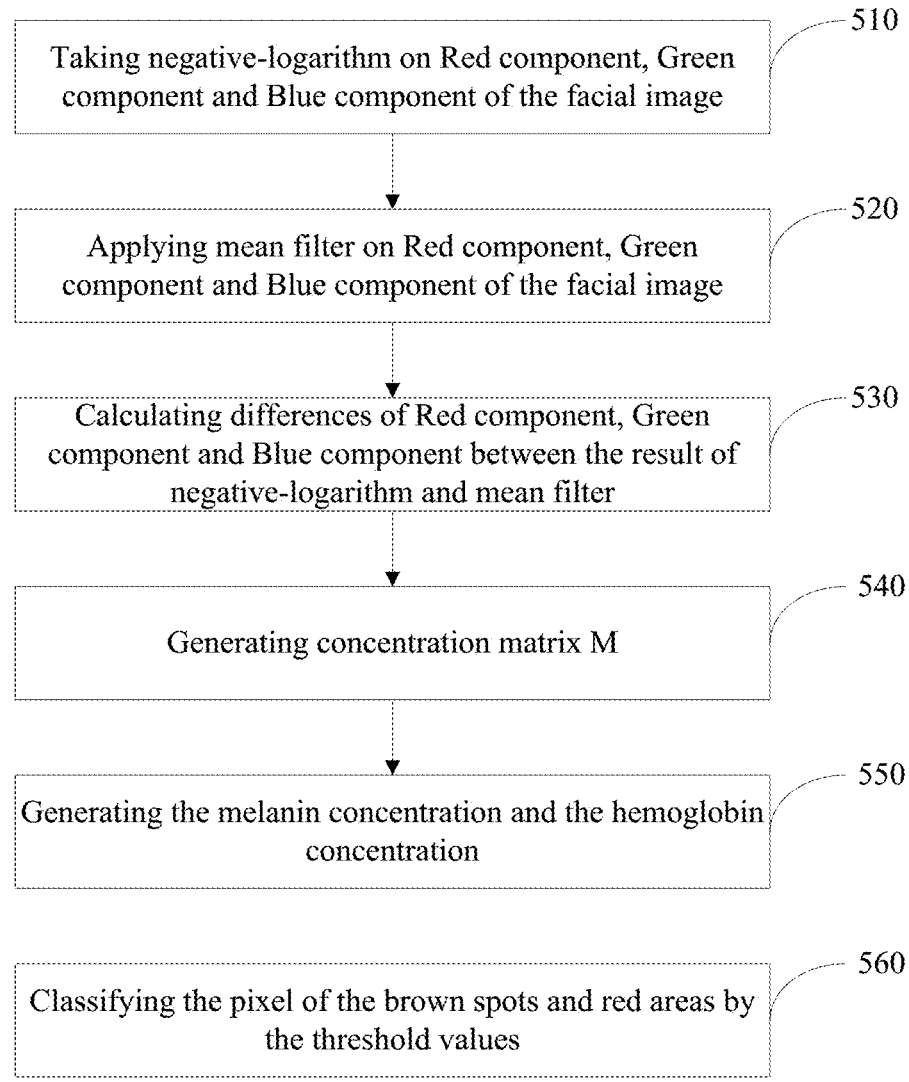
FIG. 5 is a flow chart of a method for estimating concentration of the melanin and the hemoglobin according to an embodiment of the present disclosure.

The density of melanin and hemoglobin can be estimated according to the intensity of the incident light and narrow-band assumption is applied so that the spectral sensitivities of camera sensors can be approximated by delta functions, with the property of RGB camera, As illustrated in FIG. 5, the density of melanin and hemoglobin for each pixel on the input image can be estimated by follow steps:

510: taking negative-logarithm on R, G, B components to obtain log R, log G and log B layers.

520: applying mean filter on R, G, B components to obtain $\overline{\log R}$, $\overline{\log G}$, $\overline{\log B}$ layers.

530: denoting a matrix for R, G, B components as $$\begin{bmatrix} \tilde{R} \\ \tilde{G} \\ \tilde{B} \end{bmatrix} = \begin{bmatrix} \log R - \overline{\log R} \\ \log G - \overline{\log G} \\ \log B - \overline{\log B} \end{bmatrix}.$$

The matrix indicates the difference of the Red component, Green component and Blue component between the result of negative-logarithm and mean filter.

540: generating concentration matrix M using $$M = \begin{bmatrix} \varepsilon_{mel}(\lambda_R) & \varepsilon_{hem}(\lambda_R) & 1 \\ \varepsilon_{mel}(\lambda_G) & \varepsilon_{hem}(\lambda_G) & 1 \\ \varepsilon_{mel}(\lambda_B) & \varepsilon_{hem}(\lambda_B) & 1 \end{bmatrix}$$

550: generating the melanin concentration and the hemoglobin concentration expressed as Equation (2) below:

$$M^{-1}*[\tilde{R}\tilde{G}\tilde{B}]^T = [\tilde{\alpha}_{mel} \tilde{\alpha}_{hem} \log \tilde{\gamma}]^T \quad (2)$$

Figure 6:
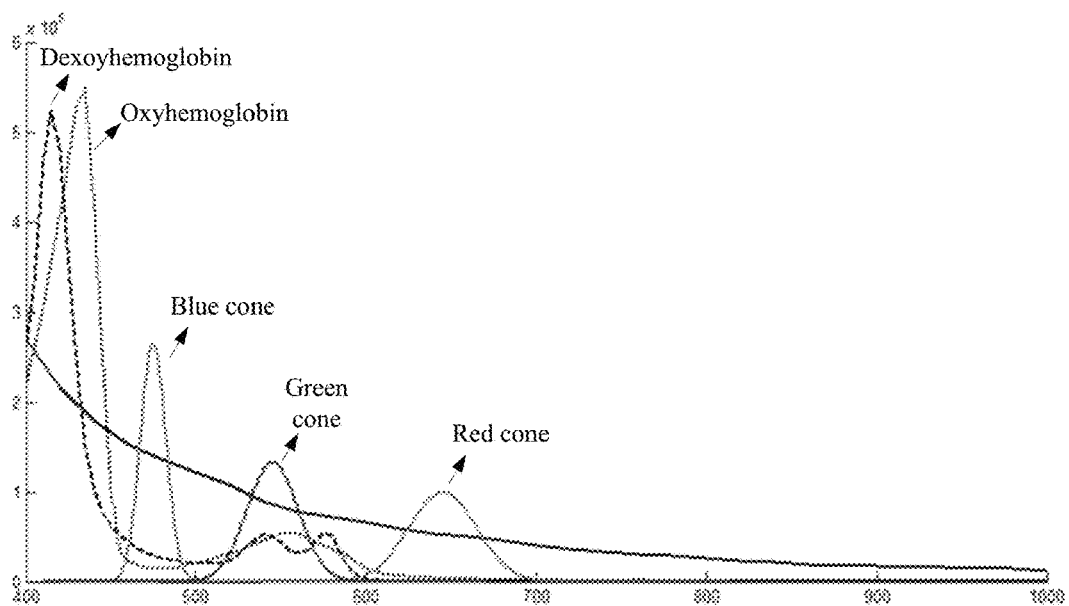
FIG. 6 is a diagram of spectral absorption of melanin and hemoglobin from 400 nm to 1,000 nm, and their relation with spectral responses of conventional RGB digital cameras.

FIG. 6 illustrates spectral absorption of melanin and hemoglobin from 400 nm to 1,000 nm, and their relation with spectral responses of conventional RGB digital cameras.

Figure 7:
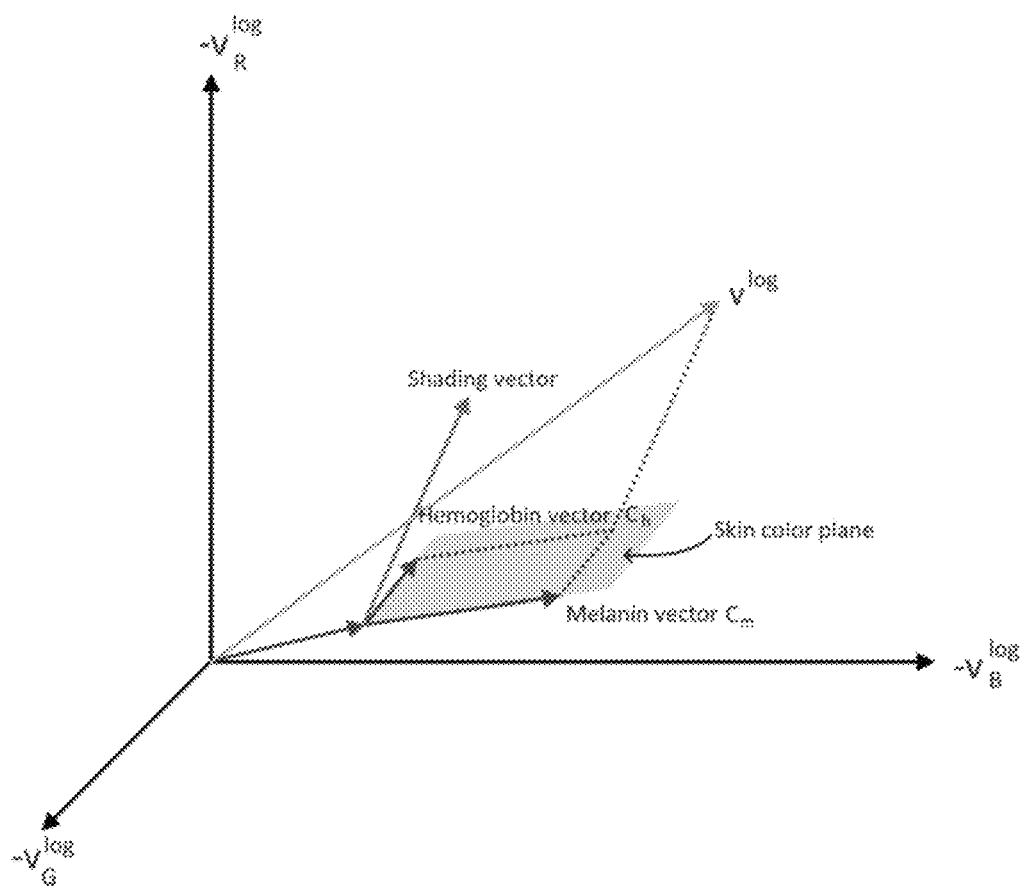
FIG. 7 is a diagram of the projection of the image signals onto the color plane which is formed by the two principal components, melanin and hemoglobin according to an embodiment of the present disclosure.

FIG. 7 illustrates the projection of the skin image signals onto the skin color plane which is formed by the two principal components, melanin and hemoglobin.

560: classifying the pixel of the brown spots and red areas by the threshold values. The threshold is an empirical value, which may defined by skilled technicians according to the practical situation.

The wrinkles count analyzing is focused on the forehead, *glabella* lines and under eyes of the facial image.

In one embodiment, the subtle curvilinear discontinuities in skin texture can be highlighted by Gabor filter bank. The subtle curvilinear discontinuity usually caused by wrinkles.

Then, the curvilinear shape of wrinkles at image sites of large Gabor filter responses could be localized by the image morphology used to incorporate geometric constraints.

Figure 8:
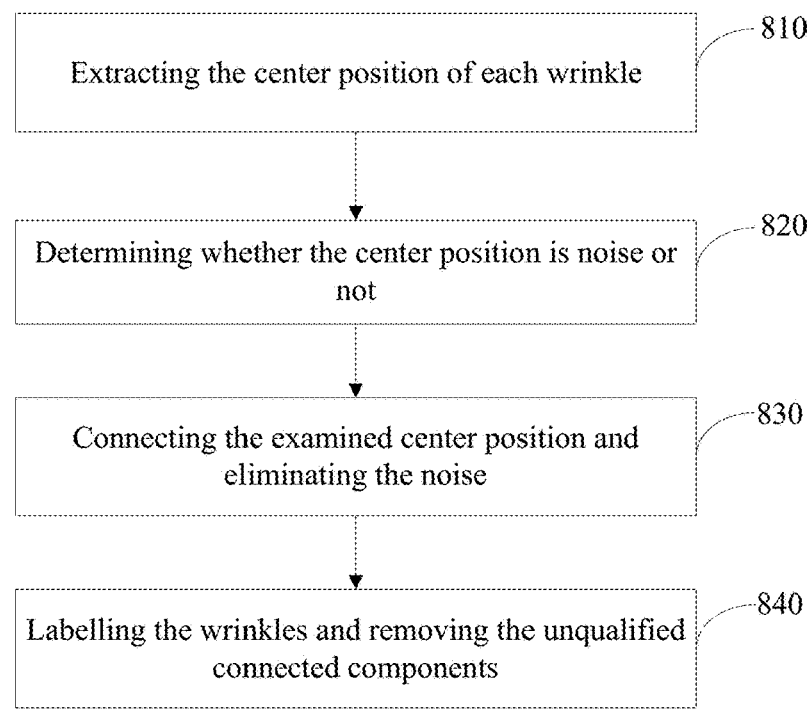
FIG. 8 is a flow chart of a method for localizing the wrinkles of the processed image according to an embodiment of the present disclosure.

As illustrated in FIG. 8, the wrinkles from the processed image can be localized by follow steps:

810: extracting the center position of each wrinkle by calculating local maximum curvatures in cross-sectional profiles.

820: determining whether the center position is noise or not, according to the neighboring pixel values.

For instance, if current pixel has a relatively small value but neighboring pixels have large values, the current pixel value should be increased to connect a line. However, if current pixel has a relatively large value but neighboring pixels have small values, the current pixel value should be reduced to eliminate noise.

830: connecting the examined center position and eliminating the noise.

840: labelling the wrinkles and removing the unqualified connected components.

For example, the connected component is isolated, too small, or having an eccentricity of less than 0.95.

The interest region of the sagging seriousness includes under eyes, nasolabial fold, mouth corner and jaw lines.

The sagging seriousness can be measured by the sagging score and analyzed by the convolutional neural network (CNN) which has been well known for image classification tasks.

In one embodiment, a CNN model could be tailor-made and trained using a sagging dataset which is comprised a plurality of sagging sample scored by expert.

Then, the trained CNN model could recognize the sagging score of the interest region of the input image.

Embodiments of the present disclosure further provide an electronic device. The electronic device may either have the function modules included in the primary device, or have the function modules of the secondary device, and may have all the function modules in both the primary device and the secondary device, such that the electronic device is used as the corresponding primary device or secondary device.

Figure 9:
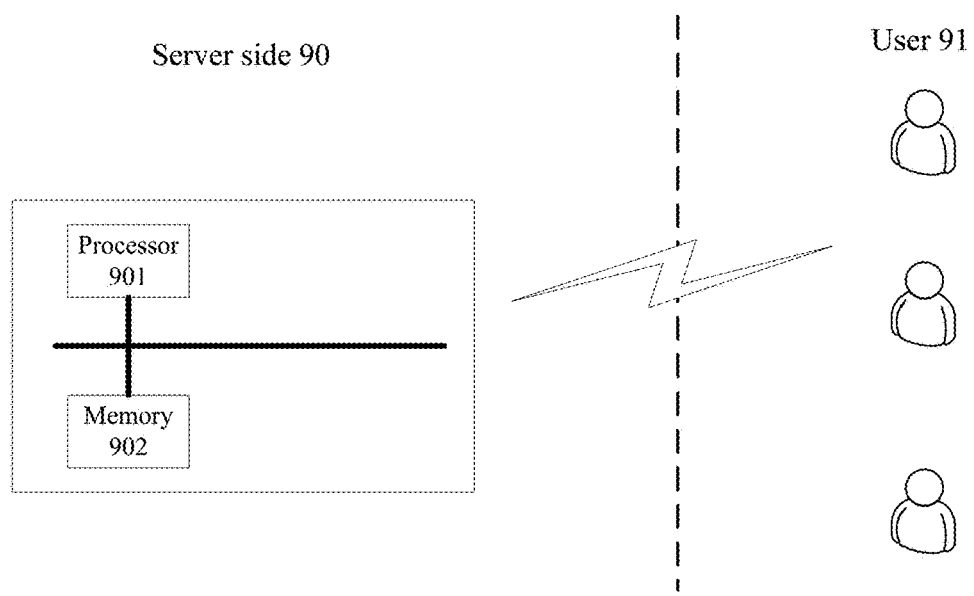
FIG. 9 is a structural block diagram of the application environment of the method for skin age estimating according to an embodiment of the present disclosure.

As illustrated in FIG. 9, the application environment of the method for facial skin age estimating includes: server side 90 and user 91.

The user 91 can use any suitable terminal (i.e. smart phone, laptop and computer) to connect with the server side 90 to upload the face image and receive the skin estimating result in any time.

the server side is consisted of one or several electronic device 9 included a processor 901 and a memory 902.

The memory 902, as a non-volatile computer-readable storage medium, may be configured to store non-volatile software programs, non-volatile computer-executable programs and modules.

The memory 902 stores an instruction program that is executable by the processor 901 and the processor 901 executes the instruction program to cause the processor 901 to implement the method for skin age estimating as disclosed below.

In one embodiment, the data or instruction program stored in the server side 90 can be adjusted to enhance the accuracy of the skin estimated result. For example, the benchmarks can be tuned during the data collection.

Professional personnel should be further aware that with reference to the embodiments of the present application disclosed herein, various exemplary Bluetooth communication steps may be implemented in the form of electronic hardware, computer software or a combination thereof. To clearly describe interchangeability between the hardware and software, the above description has generally illustrated the compositions and steps of the various example according to the functions. Whether such functions are implemented in the form of software or hardware depends on the specific application and the design restrictions applied to the entire system.

Professional technical personnel may implement the described functions by using different methods for each specific application. However, such implementation shall not be deemed as going beyond the scope of the present disclosure. The computer software program may be stored in a computer readable storage medium, wherein the computer software program, when being executed, may perform the steps and processes according to the above method embodiments. The storage medium may be any medium capable of storing program codes, such as read-only memory (ROM), a random-access memory (RAM), a magnetic disk, or a compact disc-read only memory (CD-ROM).

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

What is claimed is:

1. A method for facial skin age estimating, comprising:
resizing and aligning a facial image;
converting the facial image and a reference image from RGB color space to CIELAB color space;
adjusting illumination component and color component of the facial image depending on the reference image;
recovering the adjusted facial image from CIELAB color space to RGB color space;

analyzing a plurality of evaluation index for assessing skin condition on interest area of the facial image;

estimating the skin age of the facial image, according to the evaluation index, wherein the evaluation index comprises melanin concentration, hemoglobin concentration, wrinkles count and sagging seriousness, and wherein analyzing a plurality of evaluation index for assessing skin condition on interest area of the facial image comprises: training a convolutional neural network by a sagging dataset which is comprised a plurality of sagging sample scored by expert; recognizing the score of the sagging seriousness on under eyes, nasolabial fold, mouth corner and jaw lines of the facial image, by the trained convolutional neural network.

2. The method according to claim 1, wherein estimating the skin age of the facial image, according to the evaluation index comprises:
generating a benchmark from modeling the relationship between mean value of the evaluation index and an age group;
comparing the evaluation index of the facial image with the benchmark;
determining the age group corresponding to the image according to the comparison result of the facial image and the benchmark.

3. The method according to claim 1, wherein the interest area corresponding to the melanin concentration and the hemoglobin concentration, is the whole facial image excluding mouth area and chin area.

4. The method according to claim 3, wherein analyzing the melanin concentration and the hemoglobin concentration on interest area of the facial image comprises:
taking negative-logarithm on Red component, Green component and Blue component of the facial image, respectively;
applying mean filter on Red component, Green component and Blue component of the facial image, respectively;
calculating differences of Red component, Green component and Blue component between the result of negative-logarithm and mean filter, respectively
generating the melanin concentration and the hemoglobin concentration, according to the absorption spectra of the melanin and the hemoglobin and the differences of Red component, Green component and Blue component.

5. The method according to claim 1, wherein analyzing a plurality of evaluation index for assessing skin condition on interest area of the facial image comprises:
highlighting a subtle curvilinear discontinuity on forehead, *glabella* lines and under eyes of the facial image by Gabor filter;
localizing a curvilinear shape of wrinkles at the facial image of the subtle curvilinear discontinuities.

6. The method according to claim 1, wherein the facial image is taken from portable devices.

7. An electronic device, comprising:
a memory, a communication module and a processor coupled to the memory and the communication module;
the memory storing instructions that are executable by the processor, wherein execution of the instructions by the processor causes the processor via the communication module to:
resizing and aligning a facial image;
converting the facial image and a reference image from RGB color space to CIELAB color space;
adjusting illumination component and color component of the facial image depending on the reference image;
recovering the adjusted facial image from CIELAB color space to RGB color space;
analyzing a plurality of evaluation index for assessing skin condition on interest area of the facial image;
estimating the skin age of the facial image, according to the evaluation index, wherein the evaluation index comprises melanin concentration, hemoglobin concentration, wrinkles count and sagging seriousness, and wherein analyzing a plurality of evaluation index for assessing skin condition on interest area of the facial image comprises: training a convolutional neural network by a sagging dataset which is comprised a plurality of sagging sample scored by expert; recognizing the score of the sagging seriousness on under eyes, nasolabial fold, mouth corner and jaw lines of the facial image, by the trained convolutional neural network.

8. The electronic device according to claim 7, wherein estimating the skin age of the facial image, according to the evaluation index comprises:
generating a benchmark from modeling the relationship between mean value of the evaluation index and an age group;
comparing the evaluation index of the facial image with the benchmark;
determining the age group corresponding to the image according to the comparison result of the facial image and the benchmark.

9. The electronic device according to claim 7, wherein the interest area corresponding to the melanin concentration and the hemoglobin concentration, is the whole facial image excluding mouth area and chin area.

10. The electronic device according to claim 9, wherein analyzing the melanin concentration and the hemoglobin concentration on interest area of the facial image comprises:
taking negative-logarithm on Red component, Green component and Blue component of the facial image, respectively;
applying mean filter on Red component, Green component and Blue component of the facial image, respectively;
calculating differences of Red component, Green component and Blue component between the result of negative-logarithm and mean filter, respectively
generating the melanin concentration and the hemoglobin concentration, according to the absorption spectra of the melanin and the hemoglobin and the differences of Red component, Green component and Blue component.

11. The electronic device according to claim 7, wherein analyzing a plurality of evaluation index for assessing skin condition on interest area of the facial image comprises:
highlighting a plurality of subtle curvilinear discontinuities on forehead, *glabella* lines and under eyes of the facial image by Gabor filter;
localizing a plurality of curvilinear shapes of wrinkles at the facial image of the subtle curvilinear discontinuities.

12. The electronic device according to claim 7, wherein the facial image is taken from portable devices.

* * * * *